UNITED STATES PATENT OFFICE.

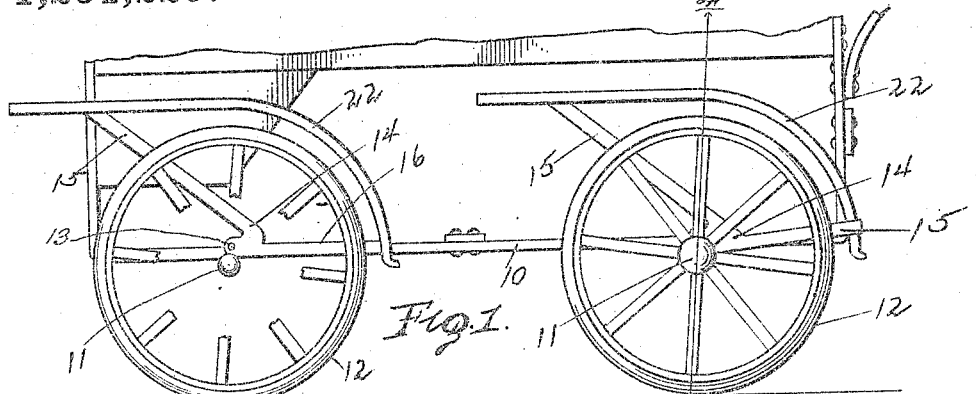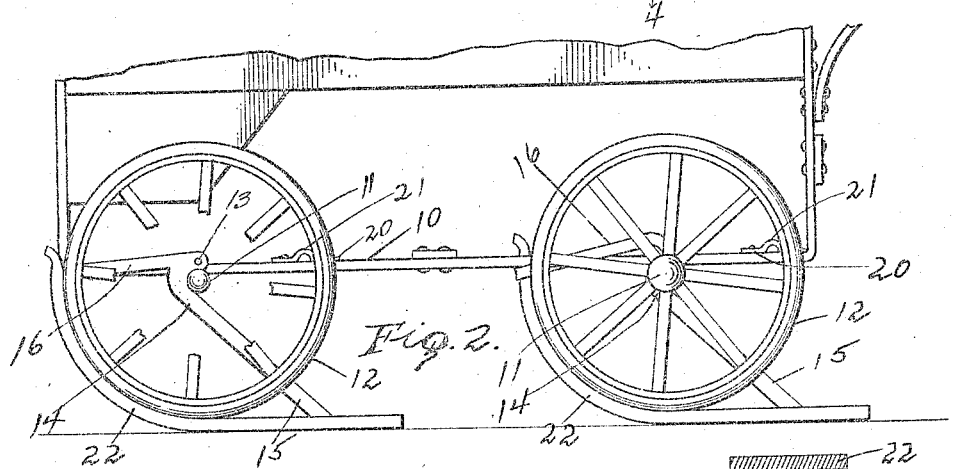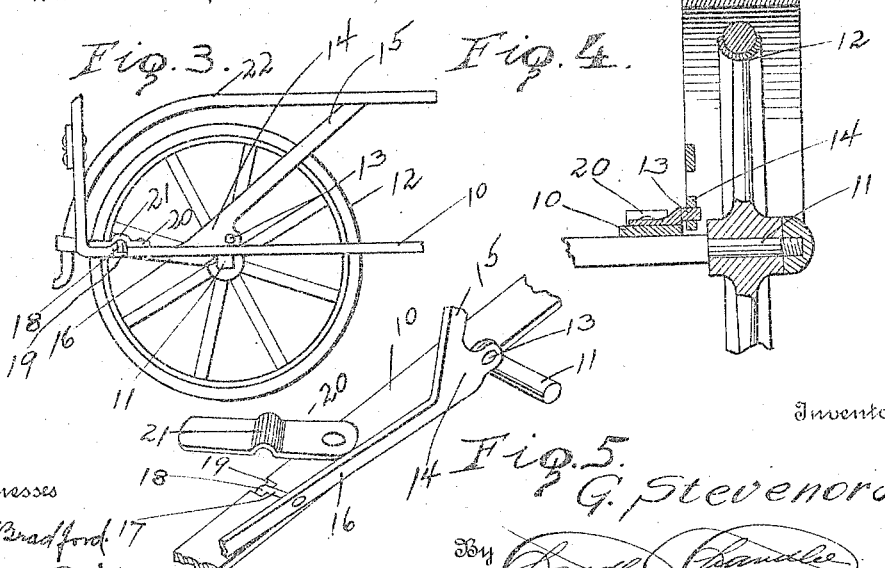

GUST STEVENOR, JR., OF ST. DAVID, ILLINOIS.

COMBINED MUD-GUARD AND SLED-RUNNER.

1,291,229.	Specification of Letters Patent.	Patented Jan. 14, 1919.

Application filed March 6, 1917.  Serial No. 152,587.

*To all whom it may concern:*

Be it known that I, GUST STEVENOR, Jr., a citizen of the United States, residing at St. David, in the county of Fulton, State of Illinois, have invented certain new and useful Improvements in Combined Mud-Guards and Sled-Runners; and I do hereby declare the following to be a full, clear, and exact description of the invention, such as will enable others skilled in the art to which it appertains to make and use the same.

This invention relates to improvements in attachments for vehicles for protecting the occupants from splashing of mud and to provide means for running the vehicles on snow and ice without removing the wheels.

One object is to provide a device of this character which is particularly adapted for attachment to small vehicles such as go-carts, children's wagons, or the like whereby a combined mud guard and sled runner is secured.

Another object is to provide a simple device of this character which can be easily applied to the ordinary folding go-cart and which can be quickly and easily moved from its position as a mud guard to its position as a sled runner.

Another object is to provide, in connection with a device of this character, certain novel means for holding the device in its mud guard position.

Other objects and advantages will be apparent from the following description when taken in connection with the accompanying drawing.

In the drawing:

Figure 1 is a side elevation of a portion of a go-cart showing my invention applied thereto and in the position of a mud guard.

Fig. 2 is a similar view of the go-cart showing the device in the position assumed when used as a sled runner.

Fig. 3 is an elevation looking from the opposite side of Fig. 1.

Fig. 4 is an enlarged vertical sectional view taken on the line 4—4 of Fig. 1.

Fig. 5 is a fragmentary perspective view of a portion of the go-cart showing the means for holding the runner and guard in elevated position.

Referring particularly to the accompanying drawing 10 represents the horizontal longitudinal bars of the go-cart on which are supported the stub axles 11, said axles carrying the wheels 12. On the bar 10, adjacent each of the stub axles, and extending toward the wheel, is a stud 13 on which is pivotally mounted a member 14. This member is formed with a pair of radially extending arms 15 and 16, the ends of which are rigidly secured to a curved guard plate which extends partially around the upper portion of the wheel, when in mud guard position, as seen in Fig. 1. Intermediate the ends of the arm 16 there is carried a laterally extending pin 17, the free end of which is turned down, as at 18 and arranged to engage in the notch 19 of the bar 10. Pivotally mounted on the upper face of the bar, and arranged to be swung over this pin 17, is a plate 20, the intermediate portion of which is bowed upwardly, as at 21 for the reception of said pin. Thus the curved member or guard plate, represented at 22, is held in an elevated position and in properly spaced relation to the tire of the wheel.

When the pin 17 is released from the pivoted plate, the member 14, together with the arms, may be swung into position beneath the wheel, and in firm engagement with the tread thereof. Thus a sled runner is formed for the wheel, which may be easily drawn or pushed over snow or ice. The fact that the curved guard fits snugly against the wheel, when in runner position, precludes the necessity for any means similar to the pin 17 for holding the same in such position. The forward dragging movement of the curved guard over the snow or ice serves to hold the same in proper position.

The device is of such simple construction that it may be easily applied to the ordinary go-cart by simply attaching one of the studs and one of the pivoted plates to the bar 10 adjacent each of the wheels. It will, of course, be understood that the device can be applied to two wheeled vehicles as well as to four wheeled ones. It is also possible to enlarge the device and apply the same to large vehicle, such as carriages, wagons, or automobiles.

What is claimed is:

The combination with the axle supporting bar and wheel of a go-cart, of a stud carried by the bar, a member pivotally mounted on the stud and formed with radial arms, a curved guard supported on the arms and arranged to lie above or beneath the wheel, a pin carried by one of the arms and arranged to engage with the bar to hold the guard above the wheel, and a movable member carried by the bar for holding the pin in bar engaging position.

In testimony whereof, I affix my signature in the presence of two witnesses.

GUST STEVENOR, JR.

Witnesses:
ROY BOUCOTT,
FRED A. WEAVER.

Copies of this patent may be obtained for five cents each, by addressing the "Commissioner of Patents. Washington, D. C."